A. A. GODFREY.
MANUFACTURE OF TILES OF LINOLEUM OR THE LIKE AND IN APPARATUS THEREFOR.
APPLICATION FILED MAR. 30, 1920.
1,361,456.
Patented Dec. 7, 1920.
5 SHEETS—SHEET 1.
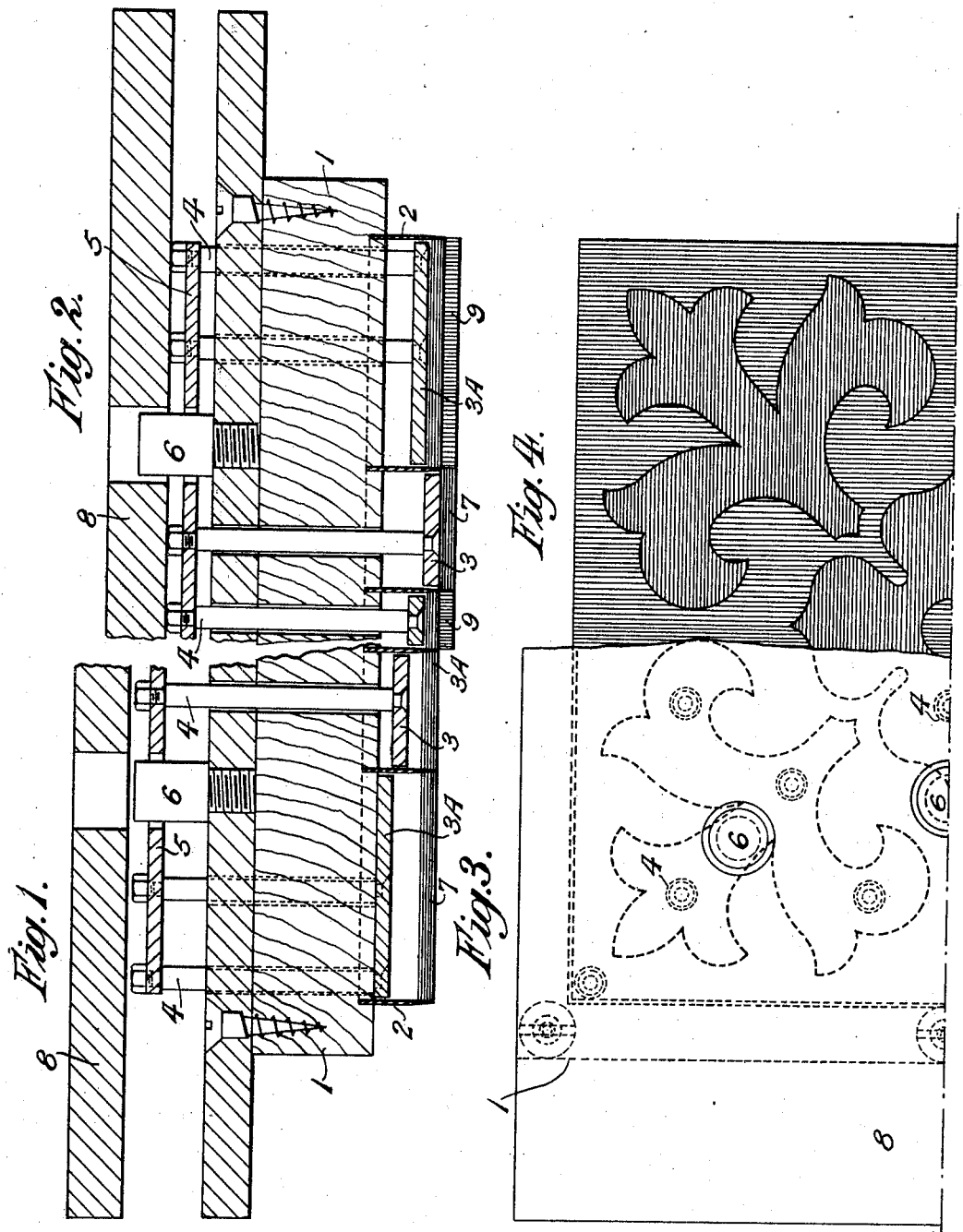

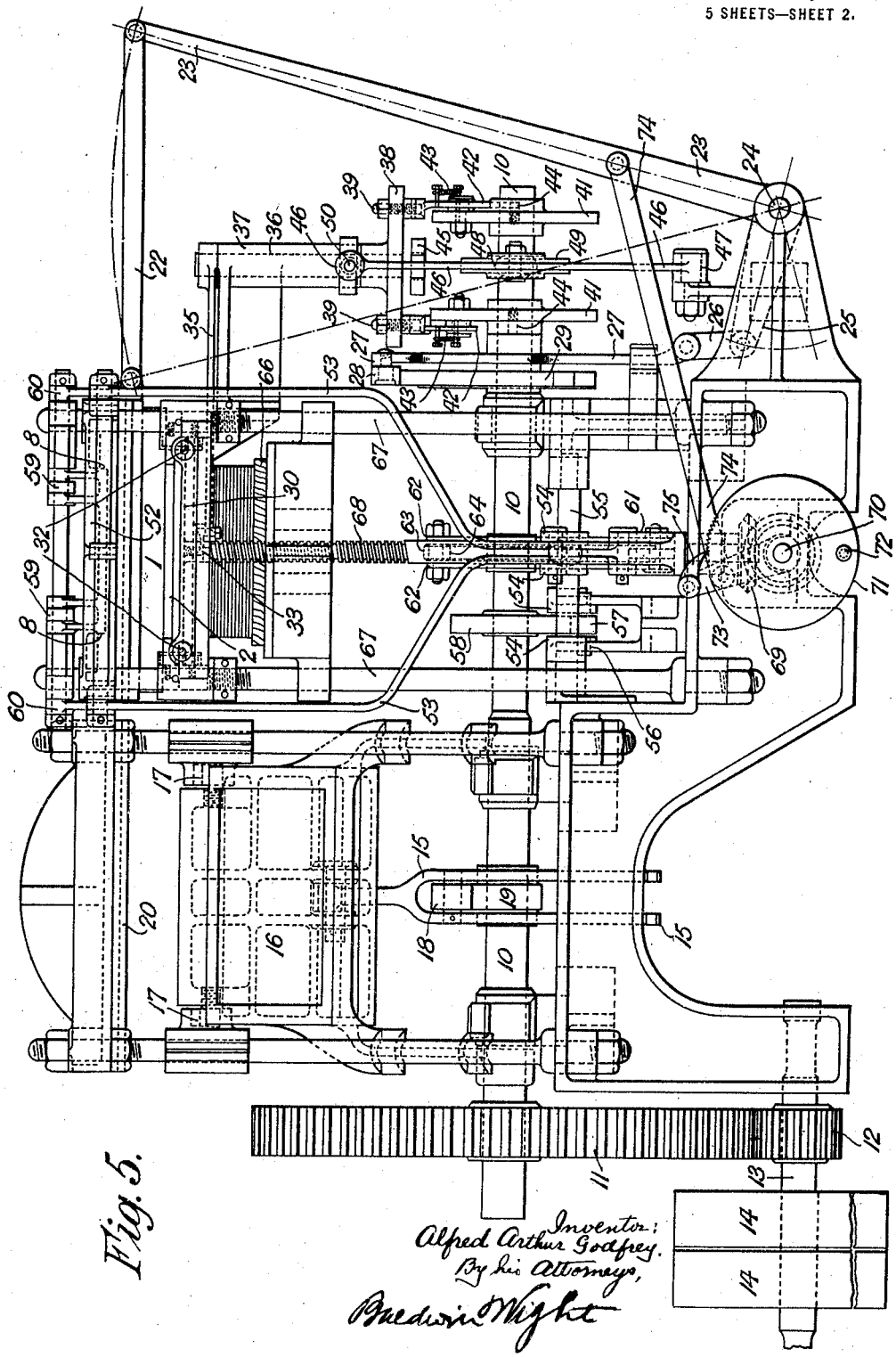

A. A. GODFREY.
MANUFACTURE OF TILES OF LINOLEUM OR THE LIKE AND IN APPARATUS THEREFOR.
APPLICATION FILED MAR. 30, 1920.
1,361,456.
Patented Dec. 7, 1920.
5 SHEETS—SHEET 3.
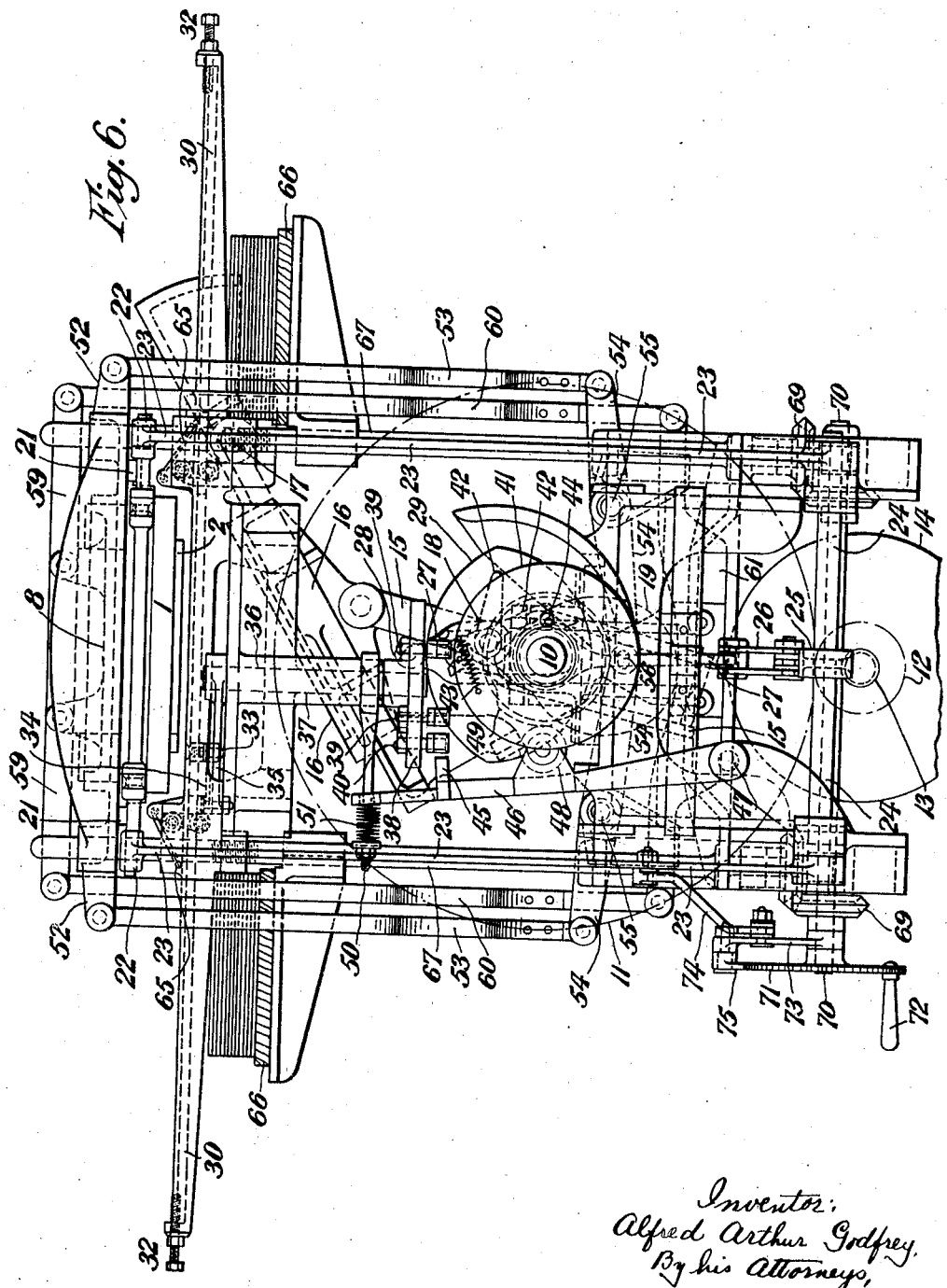
Inventor:
Alfred Arthur Godfrey,
By his Attorneys,
Baldwin Wight

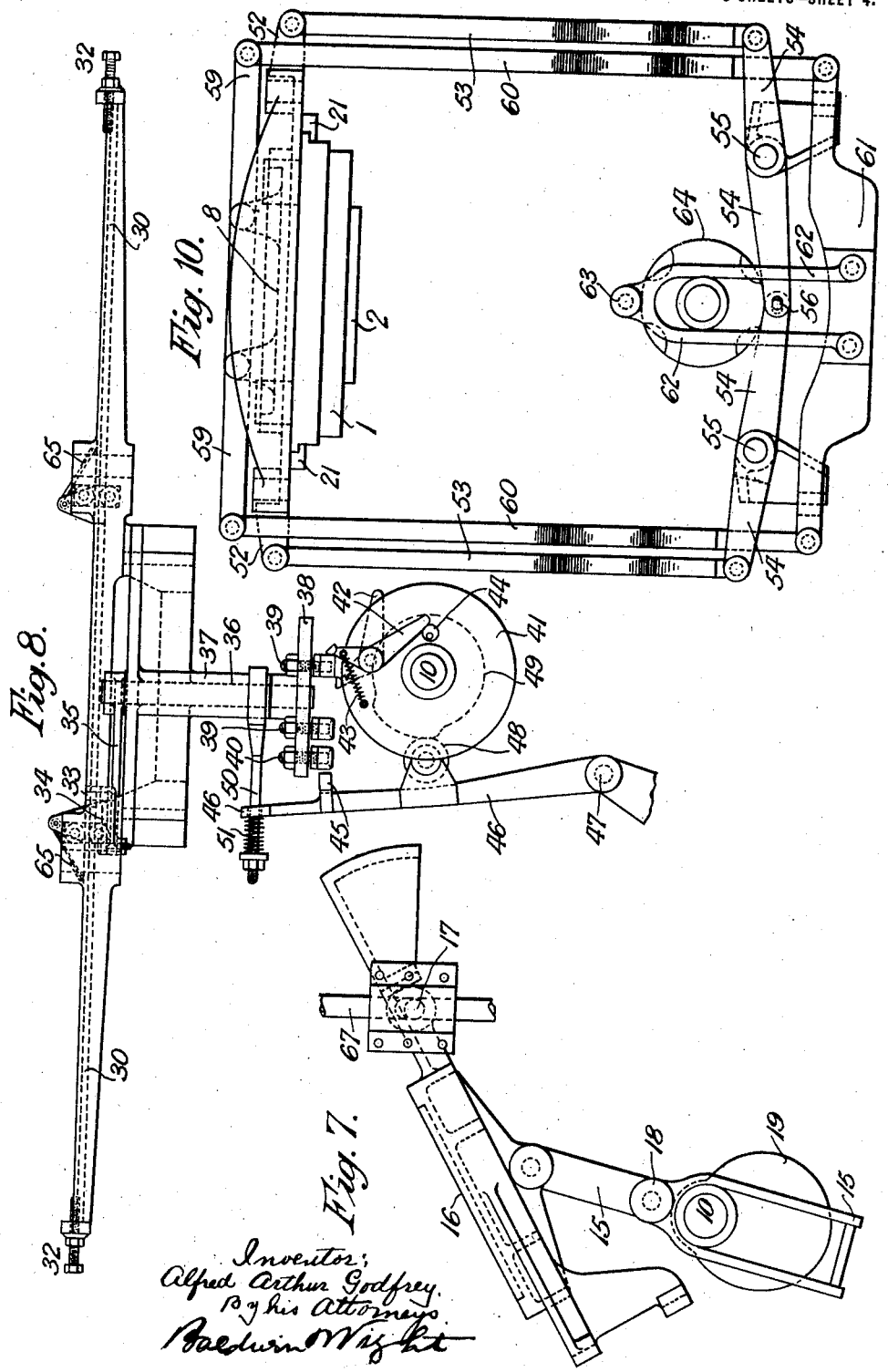

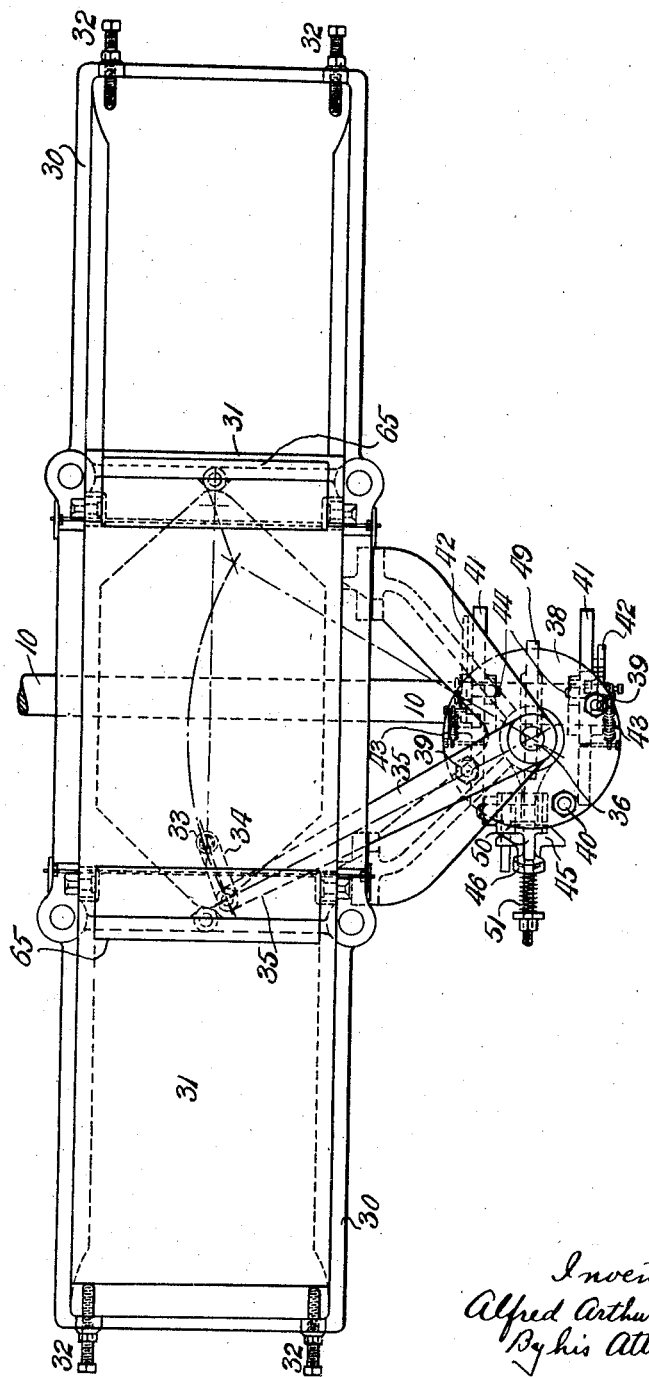

UNITED STATES PATENT OFFICE.

ALFRED ARTHUR GODFREY, OF LONDON, ENGLAND.

MANUFACTURE OF TILES OF LINOLEUM OR THE LIKE AND IN APPARATUS THEREFOR.

1,361,456.	Specification of Letters Patent.	Patented Dec. 7, 1920.

Application filed March 30, 1920. Serial No. 369,869.

*To all whom it may concern:*

Be it known that I, ALFRED ARTHUR GODFREY, a subject of the King of Great Britain, residing at 6 Old Bailey, London, England, have invented new and useful Improvements in the Manufacture of Tiles of Linoleum or the like and in Apparatus Therefor, of which the following is a specification.

This invention relates to a method of manufacturing tiles of linoleum or like material, and to apparatus therefor. The invention relates more particularly to the manufacture of tiles of two colors but it may be applied also to the manufacture of tiles of more than two colors. Hereinafter I will describe it for the sake of clarity as applied to the manufacture of tiles in blue and white.

According to this invention I employ a mold or die having thin walls which divide or cut the material as it is forced into the mold and having in it two plungers or series of plungers, one set in advance of the other at a distance equal to the thickness of the tile, and both mounted so that they can be moved relatively to the body of the mold so as to extrude the material with which it has been filled. I first fill the mold with material of one color, say, white, preferably by raising a sheet of the material into the inverted mold, I then place the mold upon a plate or table and move the plungers downward so as to extrude part, say, the center of the tile, while the remainder or surround remains in the mold. I then lift the mold from the plate and place it upon another portion of the plate or upon another plate and again move the plungers other plate and again move the plungers downward, lifting the body of the mold so that the surround is extruded from the mold on to the plate. I then fill the mold with blue material and place the mold upon the plate in the second position referred to above and extrude the blue center into the white surround previously placed upon the plate, I then transfer the plate to the first position mentioned above and extrude the blue surround around the white center previously placed upon the plate. Preferably the mold is capable of reciprocatory movement along horizontal guides, and at one end of its travel a table having a sheet of material laid upon it is raised beneath the mold so that the latter is filled, the table then drops and the mold moves to the other end of its travel, while it is in this position a plate capable of reciprocatory horizontal movement in a direction at right angles to the direction of movement of the mold is brought beneath it and the center is extruded on to the plate which is then moved so that the extruded material is clear of the mold and the surround is then extruded on to the plate; the mold then moves back and receives its charge of blue material, it then again moves above the plate and the blue center is extruded into the white surround, the plate is then moved back and the blue surround is extruded around the white center, whereupon the sequence of operations is repeated.

It is obvious that a mold may be large enough to form more than one tile at each operation.

My invention is illustrated by the accompanying drawings, of which Figure 1 is a section through part of a mold, Fig. 2 a section through another part of the mold showing the parts in a different position, Fig. 3 is a plan of the parts shown in Fig. 1 and Fig. 4 is a plan of part of a tile formed by the mold. Fig. 5 is an elevation of a machine for making linoleum tiles, Fig. 6 is an elevation at right angles to Fig. 5, Fig. 7 is an elevation of the feeding table, Figs. 8 and 9 are an elevation and plan of the depositing table and Fig. 10 is an end elevation of the mold operating mechanism.

Referring to Figs. 1 to 4, 1 is a block carrying on its under surface a mold formed of thin walls 2 according to the pattern of the tile to be produced. Between the walls 2 are plungers, one series of plungers 3 being set in advance of the other series $3^A$ at a distance approximately equal to the thickness of the material from which the tile is to be formed. These plungers are carried by rods 4 which can move vertically through the block, the tops of the rods being secured to a plate 5 having in it holes so that it can be moved downward around studs 6 secured to the block 1. In Fig. 1 the mold is shown after it has received a charge of material 7. The mold so charged is then moved over a plate and the plungers are all moved to the position shown in Fig. 2 by the descent of an extrusion head 8 having in it suitable orifices through which the studs 6 can pass. The material beneath the plungers 3 is therefore extruded from the mold on to the plate but the material beneath the plungers $3^A$ is not extruded. The block and mold are then lifted and another portion of the plate is presented beneath the mold, whereupon the extrusion head is again moved downward and the block and mold are lifted so that the material beneath the plungers 3ᴬ is extruded from the mold on to the plate, the mold is then charged with material of a different color and returned to the position it last occupied; the plungers again descend and the material beneath the plungers 3 is extruded so as to form with the material already on the plate a complete tile. The first portion of the plate is then presented beneath the mold and the material beneath the plungers 3ᴬ is extruded to form with the material already on the plate a second complete tile. It will be understood that in Fig. 2 the mold is shown with the plungers 3 extruding material 7 on to a part of the plate on which material 9 of a different color has already been deposited.

In the machine shown in Figs. 5 to 10, 10 is the main shaft driven by spur wheels 11, 12, from a shaft 13 having on it fast and loose pulleys 14. On the shaft 10 works a slotted arm 15 pivoted to a table 16 which is pivoted to the frame of the machine at 17. The arm 15 carries a roller 18 working upon the surface of a cam 19 fast on the shaft 10. These parts are plainly seen in Fig. 7. In the position in which the parts are shown in that figure the table is down and is inclined at such an angle that an operator can readily place upon it a slab of material. As the shaft 10 rotates the table is raised beneath the mold which is supported at this moment in guides 20 and which receives a charge of material. The operator places upon the table slabs of the two colors alternately. The mold is then moved across the machine into a position in which it is supported by guides 21, and in which the material is extruded from the mold. This movement of the mold is effected as follows:—

The mold is connected by links 22 to arms 23 fast on a shaft 24 on which is an arm 25 connected by links 26, 27, to a bowl 28 running on a cam 29 on the shaft 10. Beneath this new position of the mold are fixed rails 30 upon which can move a depositing plate 31. 32 are adjustable stops to limit the movement of the plate.

The movement of the plate upon the rails is effected as follows:—

A pin 33 projecting downward beneath the plate near its middle is connected by a link 34 to an arm 35 on a vertical shaft 36 supported in a long bearing 37. On the bottom of this shaft is a disk 38 having in it three studs 39, 39 and 40. Fast on the shaft 10 are two disks 41, 41, and on each disk is pivoted a finger 42 connected to a spring 43. As the shaft 10 rotates one of these fingers comes against one of the studs 39 and is thereby turned on its pivot extending its spring 43 until it meets a stop 44 whereupon the finger being unable to turn further on its pivot the disk 38 is turned so that the arm 35 causes the plate 31 to move from one of the rails 30 to the other. At the next revolution of the shaft 10 the other finger 42 comes against the other stud 39 with the result that the disk 38 is turned in the opposite direction to that in which it was before turned and the plate is moved back to the position it first occupied. Thus for each revolution of the shaft 10 the plate is moved from one end to the other of the rails 30.

The plate is locked at each end of the travel by means of a wedge 45 which engages the third stud 40 on the disk 38. This wedge is carried by an arm 46 pivoted to the frame at 47 and carrying a bowl 48 actuated by a cam 49 on the shaft 10. The top of the arm 46 is guided by a rod 50 carried by the bearing 37 and having mounted upon it a spring 51 which keeps the bowl 48 up to the cam 49.

The guides 21 are carried by a frame 52 (see Fig. 10) connected by links 53 to the outer ends of two levers 54, 54, having fixed fulcra 55, 55, and having their inner ends connected by a pin 56 on which is mounted a bowl 57 coöperating with a cam 58 on the shaft 10.

The extrusion head 8 (Figs. 1 and 2) is attached to bars 59, 59, connected by links 60, 60, to the ends of a bar 61 on which is a stirrup 62 carrying a bowl 63 coöperating with a cam 64 on the shaft 10.

The arrangement is such that after the mold has arrived over a depositing plate the mold and the extrusion head are caused by the cams 58 and 64 to move down together, but the extrusion head moves farther than the mold with the result that the plungers 3 extrude the material beneath them on to the plate 31, the mold and extrusion head then rise, the latter slightly in advance of the former, they are then both moved down again together, the head again moving farther than the mold and they are then raised, but this time the mold rises before the head with the result that the material beneath plungers 3ᴬ is extruded on to the plate. Hinged above the plate are two scrapers 65 so arranged that as the plate moves carrying a tile from beneath the mold the tile turns the scraper beneath which it passes upward, but on the return movement the scraper stops the movement of the tile which therefore falls off the plate on to one of a pair of shelves 66, 66, (see Fig. 6). These shelves can move up and down vertical columns 67, 67, and are actuated by screws 68, driven by miter gear 69 from a shaft 70 fast on which is a ratchet wheel 71 provided with a handle 72 by which it can be turned to raise the shelves to their initial positions.

Pivoted on the shaft 70 is an arm 73 connected by a link 74 to one of the arms 23 and carrying a pawl 75 engaging the teeth of the wheel 71 so that each time the mold is moved by the arm 23 the screws 68 are rotated by the pawl and ratchet to lower the shelves slightly so that a tile when it is scraped off the plate 31 is deposited gently upon the pile of tiles already on a shelf.

The sequence of operations is as follows:—

Again assuming for the sake of clarity that blue and white tiles are to be made and calling the two parts of the pattern the center and surround, a slab of white material is placed upon table 16 when it is in the position shown in Fig. 7, the table is then raised beneath the mold which thus receives a charge of white material, the mold is then moved over to the position in which it is seen in Fig. 5, the plate being in the position shown in Fig. 9, a white center is deposited on the plate on the right (as viewed in Fig. 9) end of the plate, the plate is then moved over to the right and a white surround is deposited on the left end of the plate, the mold moves back to its first position and receives a charge of blue which has in the meantime been placed upon the table. The mold is then moved again into the extruding position and a blue center is deposited into the white surround on the left end of the plate, thus making a complete tile. The plate then moves to the left, the white center which was on its right end being scraped off as waste, the blue surround is then deposited on the right end of the plate, the mold receives a white charge and deposits a white center on the right end of the plate which then moves to the right, the finished tile on the left end being scraped off on to a shelf, whereupon a white surround is deposited on the left end of the plate, the mold receives a charge of blue and deposits a blue center into this white surround, the plate moves to the left and the finished tile on its right end is scraped off on to a shelf and so on.

What I claim is:—

1. The process of forming tiles of linoleum or like material in two colors, which consists in filling a mold with material of one color, extruding a portion of the material, then extruding the remainder, filling the mold with material of the other color, extruding a portion of this material to form with the remainder before mentioned a complete tile and then extruding the remainder to form with the first extruded portion of the material of the first color a second complete tile.

2. The process of forming tiles of linoleum or like material in two colors, which consists in filling a mold with material of one color, extruding on to one part of a depositing plate a portion of the material, then extruding on to another part of the plate the remainder, filling the mold with material of the other color, extruding on to the second part of the depositing plate a portion of this material to form with the remainder before mentioned a complete tile and then extruding on to the first part of the depositing plate the remainder to form with the first extruded portion of the material of the first color a second complete tile.

3. A mold suitable for making tiles of linoleum or like material having a partition, the partition and sides of the mold being formed with cutting edges and having two plungers adapted to extrude material from the mold, one plunger being set in advance of the other.

4. In a machine for making tiles of linoleum or like material, the combination of a mold comprising means for dividing the material into two portions, namely, a center and a surround, a depositing plate adapted to receive the material from the mold, means for extruding one portion, say, the surround, on to the plate, and means for subsequently extruding the other portion, say, the center, on to another part of the plate.

5. In a machine for making tiles of linoleum or like material, the combination of a mold comprising means for dividing the material placed into it into two portions, namely, a center and a surround, a depositing plate adapted to receive the material from the mold, means for extruding one portion of the material, say, the surround, on to the plate, means for causing a relative movement between the plate and the mold whereby a different part of the plate is presented to the mold, and means for extruding the remaining portion, say, the center, on to a part of the plate different from that part on to which the first portion is extruded.

6. In a machine for making tiles of linoleum or like material, the combination of a partitioned mold adapted to divide material placed into it into two portions, namely, a center and a surround, a depositing plate adapted to receive material from the mold, means for reciprocating the plate beneath the mold, means for extruding from the mold one portion of the material, say, the surround, and means for subsequently extruding the remaining portion, say, the center.

7. In a machine for making tiles of linoleum or like material, the combination of a partitioned mold adapted to divide material placed into it into two portions, namely, a center and a surround, means for charging the mold with material, a depositing plate adapted to receive the material from the mold, means for reciprocating the plate beneath the mold, means for extruding from the mold on to one part of the plate one portion of the material, say, the surround, and means for subsequently extruding on to a different part of the plate the remaining portion, say, the center.

8. In a machine for making tiles of linoleum or like material, the combination of a partitioned mold adapted to divide the material placed in it into two portions, namely, a center and a surround, a table adapted to charge the mold wtih material, a depositing plate adapted to receive the material from the mold, means for moving the mold from a position above the table to a position above the plate and back again, means for reciprocating the plate beneath the mold, means for extruding from the mold on to one part of the plate one portion, say, the surround, and means for subsequently extruding on to a different part of the plate the remaining portion, say, the center.

9. In a machine for making tiles of linoleum or like material, the combination of a partitioned mold, two plungers capable of vertical movement therein, one being set in advance of the other, a depositing plate adapted to receive material from the mold, means for reciprocating the plate beneath the mold and means for causing a plunger to extrude the material beneath it on to the plate when the latter is at rest in one position and for causing the other plunger to extrude the material beneath it on to the plate when the latter is in another position.

10. In a machine for making tiles of linoleum or like material, the combination of a partitioned mold, two plungers capable of vertical movement therein, one being set in advance of the other, a table adapted to charge the mold with material, a depositing plate adapted to receive material from the mold, means for reciprocating the plate beneath the mold and means for causing a plunger to extrude the material beneath it on to the plate when the latter is at rest in one position and for causing the other plunger to extrude the material beneath it on to the plate when the latter is in another position.

11. In a machine for making tiles of linoleum or like material, the combination of a partitioned mold adapted to divide the material placed in it into two portions, namely, a center and a surround, means for imparting a to and fro movement to the mold, a charging table, means for raising the table beneath the mold when the latter is at one end of its travel, a depositing plate, means for reciprocating the plate beneath the position which the mold occupies when at the other end of its travel, means for extruding from the mold on to one part of the plate one portion of the material contained in the mold, say, the surround, and means for subsequently extruding on to another part of the plate the remaining portion, say, the center.

12. In a machine for making tiles of linoleum or like material, the combination of a partitioned mold having its sides and partition formed with cutting edges, a table adapted to charge the mold with material, means for raising the table up to the mold, a depositing plate, means for imparting to the mold a movement from a position above the table to a position above the plate and back again, means for reciprocating the plate so as to cause it to present different parts beneath the mold, two plungers capable of vertical movement in the mold and means for successively actuating the plungers and for causing them to deliver different portions of the material in the mold on to different parts of the plate.

In testimony that I claim the foregoing as my invention, I have signed my name this 11th day of March, 1920.

ALFRED ARTHUR GODFREY.